US010230719B2

(12) United States Patent
Vaughn et al.

(10) Patent No.: US 10,230,719 B2
(45) Date of Patent: Mar. 12, 2019

(54) HEAD MOUNTED SECURE DISPLAY SYSTEM (71) Applicant: Intel Corporation, Santa Clara, CA (US)

(72) Inventors: Robert Lawson Vaughn, Portland, OR (US); Don C Atwood, Albuquerque, NM (US)

(73) Assignee: Intel Corporation, Santa Clara, CA (US)

( * ) Notice: Subject to any disclaimer, the term of this patent is extended or adjusted under 35 U.S.C. 154(b) by 7 days.

(21) Appl. No.: 15/269,440

(22) Filed: Sep. 19, 2016

(65) Prior Publication Data

US 2018/0082474 A1 Mar. 22, 2018

(51) Int. Cl.
G06T 19/00 (2011.01)
H04L 29/06 (2006.01)
G06F 3/147 (2006.01)
H04N 5/225 (2006.01)
H04W 12/06 (2009.01)

(52) U.S. Cl.
CPC .......... *H04L 63/0853* (2013.01); *G06F 3/147* (2013.01); *H04L 63/083* (2013.01); *H04N 5/2257* (2013.01); *H04W 12/06* (2013.01); *G09G 2354/00* (2013.01); *G09G 2358/00* (2013.01); *H04L 2463/082* (2013.01)

(58) Field of Classification Search
CPC ... G06T 19/006; G09G 5/003; H04L 63/0861; H04L 63/0853; H04L 2463/082; H04N 5/2252; G06F 21/6218
See application file for complete search history.

(56) References Cited

U.S. PATENT DOCUMENTS

| 9,600,069 | B2* | 3/2017 | Publicover | G06F 3/013 |
| 9,747,433 | B2* | 8/2017 | Patel | G06F 21/44 |
| 2004/0061663 | A1* | 4/2004 | Reynolds | G02B 27/0176 345/8 |
| 2006/0115130 | A1* | 6/2006 | Kozlay | G02B 27/0093 382/117 |
| 2012/0224134 | A1* | 9/2012 | Muller | G02C 5/143 351/43 |
| 2013/0205410 | A1* | 8/2013 | Sambamurthy | G06F 21/554 726/28 |

(Continued)

OTHER PUBLICATIONS

Usamentiaga, Rubén, et al. "Infrared thermography for temperature measurement and non-destructive testing." Sensors 14.7 (2014): 12305-12348.*

(Continued)

*Primary Examiner* — Yu Chen (74) *Attorney, Agent, or Firm* — Schwegman Lundberg & Woessner, P.A.

(57) ABSTRACT

Embodiments of a system and method for securely displaying media using a pair of goggles are generally described herein. A method may include playing secure media using a lens of the pair of goggles, monitoring a plurality of gaskets mounted on the pair of goggles to determine whether a breach has occurred, and detecting, using a camera mounted on the pair of goggles, whether inorganic matter is present within a field of view. The method may include issuing an alert in response to detecting the breach or detecting inorganic matter, and ceasing playback of the secure media in response to the alert.

25 Claims, 7 Drawing Sheets (56) References Cited

U.S. PATENT DOCUMENTS

| | | | | |
|---|---|---|---|---|
| 2014/0098009 A1* | 4/2014 | Prest | ............... | G02B 27/0176 345/8 |
| 2014/0139407 A1* | 5/2014 | Abdollahi | .......... | G02B 27/0176 345/8 |
| 2014/0282911 A1* | 9/2014 | Bare | ................ | G06T 19/006 726/4 |
| 2016/0035233 A1* | 2/2016 | Breed | ................ | G09B 7/00 345/8 |
| 2017/0035308 A1* | 2/2017 | Gulati | ............. | A61B 5/02416 |
| 2017/0162177 A1* | 6/2017 | Lebeck | ............ | G06F 21/6218 |

OTHER PUBLICATIONS

Jinling, Wu, Han Dengke, and Liu Hongyun. "Study of a miniature probe fluorescence temperature sensor." Intelligent Computation Technology and Automation (ICICTA), 2012 Fifth International Conference on. IEEE, 2012.*

* cited by examiner

HEAD MOUNTED SECURE DISPLAY SYSTEM

BACKGROUND

Modern computing systems have displays that produce visible images that are seen by human end users. When the information being displayed is sensitive or requires additional security, then the risk of data loss is significant. Known methods of reducing risk of digitally displayed information include using contracts, policies, and other administrative measures to encourage adherence to intended behaviors, secure rooms, goggles/glasses with integrated displays, privacy system screen filters (e.g., monitor filter, privacy screen) where a user places a thin film on a monitor to reduce the viewing angle, and other types of display systems. Unfortunately, all of those methods have serious drawbacks that are either administrative or technological.

For example, contracts, policies, and other administrative measures to encourage adherence to intended behaviors include a risk that users will not follow the rules. Secure rooms include a risk that an employee (or others) will bring a camera into the room. Goggles/glasses with integrated displays include a risk that an employee will use a fiber optic scope camera (or similar) or that an employee will use camera equipment with zoom capable of resolving images at a distance (e.g., of an expected size of room where employees would be expected to work).

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Systems and methods for presenting secure media using a goggle apparatus or goggles that have integrated displays are described herein. The systems and methods herein describe goggles with additional components to detect if someone is attempting to eavesdrop or record the displayed video information. The systems and methods described herein may include providing a user the ability to securely view information on a digital display. The systems and methods described herein allow for a video display to be seen by a person without the possibility of an unauthorized user viewing those images as well as detection systems to prove that no one else saw those images.

In an example, the systems and methods described herein may prevent unauthorized viewing by securing goggles with a display for a user. The goggles may reduce or eliminate risk of having the display viewed by another individual. For example, the display system may prevent others from viewing the displayed information, as in viewing by looking over one's shoulder. The display system may prevent the recording of displayed information from nearby recording devices such as digital cameras. The display system may prevent the recording of displayed information from miniaturized or decoupled camera devices such as remote cameras placed on the user or fiber optic lens systems. The display system may prevent the recording of displayed information from miniaturized or decoupled camera devices, such as remote cameras or fiber optic lens systems installed in or through the human body such as the threading of fiber optic lines installed subcutaneously in soft tissue. The display system may prevent the recording of displayed information from miniaturized or decoupled camera devices such as remote cameras or fiber optic lens systems placed on or within the display system. The display system may provide a feedback mechanism to auditors (or others) to manage breaches of security as well as anomaly detection/mitigation. The display system may be practical and useful with minimal system or calibration.

The systems and methods described herein may detect a breach in a gasket (e.g., a seal of the goggles that contact with a user's face), such as a breach using a 0.5mm camera mounted on a fiber optic thread. In another example, a user's face may be observed from within the goggles to detect small cameras that may be mounted on the user's skin. For example, using a camera with visible or infrared (IR) imaging may detect objects as small as 0.5mm.

Figure 1:
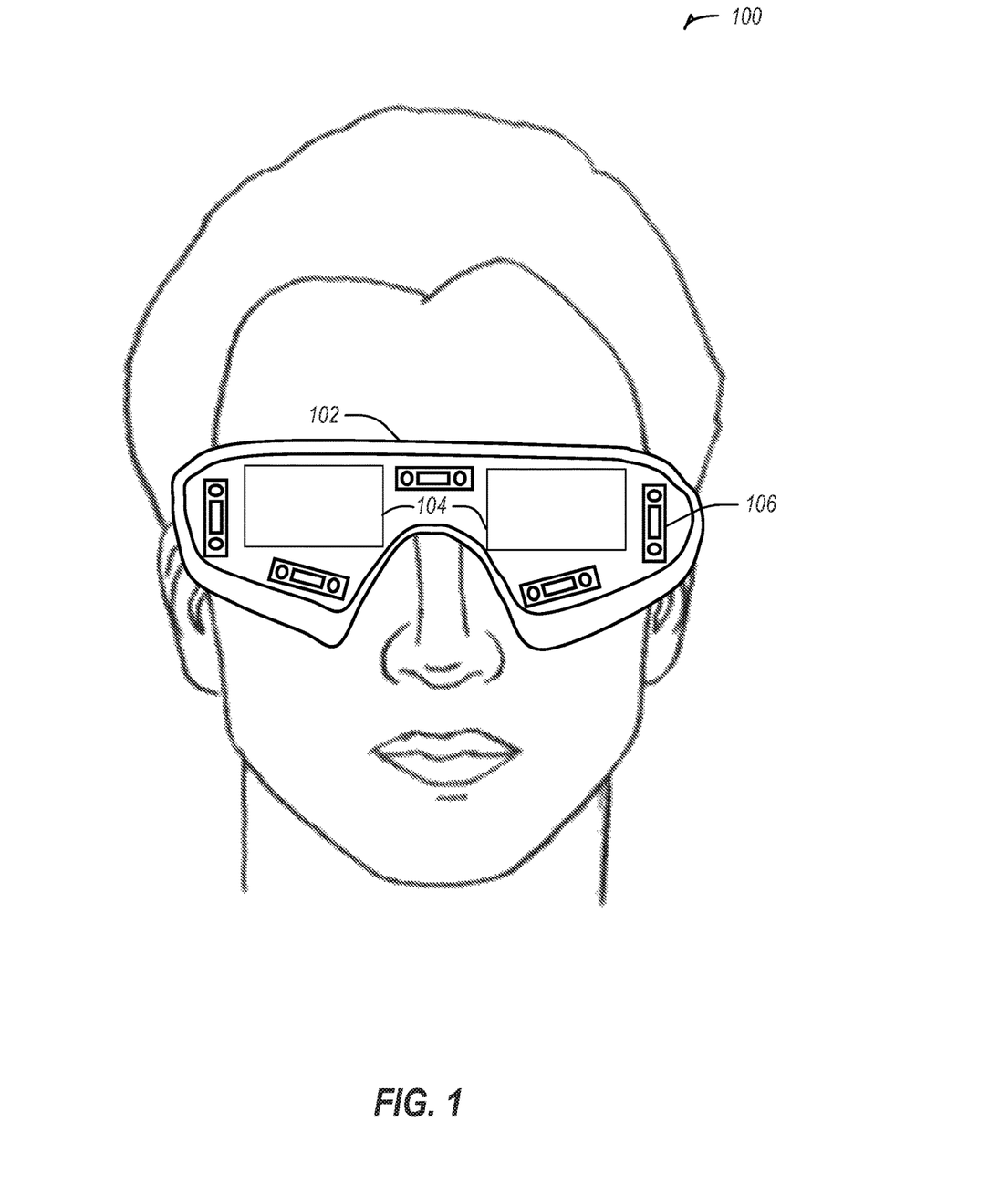
FIG. 1 illustrates a front facing view of a system including goggles for secure media viewing in accordance with some embodiments.

FIG. 1 illustrates a front facing view of a system 100 including goggles 102 for secure media viewing in accordance with some embodiments. The goggles 102 include displays 104 (e.g., liquid crystal display (LCD) or light emitting diode (LED) screens), and a plurality of cameras (e.g., camera 106). Specific technical terms, such as LCD, may be provided herein for context. Other similar products or technologies may be used, such as LED, organic light emitting diode (OLED), or the like instead of LCD. For example, a goggle display system 100 may use two LCDs as stereoscopic displays 104.

In an example, the goggles 102 create an enclosed space when placed on the user's head. This enclosure may prevent conventional recording devices from recording media played on the displays 104. The enclosed space provides for a clean detection delineation from the human face to the goggle boundaries.

In an example, the plurality of cameras (e.g., camera 106) may include visible light camera filters, infrared camera filters, or both. The plurality of cameras (e.g., camera 106) and the displays 104 are shown in FIG. 1 as they would appear through an x-ray view of the goggles 102. The plurality of cameras (e.g., camera 106) and the displays 104 in the goggles 102 are directed towards the face of the user; the plurality of cameras (e.g., camera 106) to monitor the user and the displays 104 to display content visible by the user.

In an example, the camera 106 monitors the face of the user while the user is wearing and using the goggles 102. If the system 100 detects inorganic matter (e.g., plastic or metal), a flag (e.g., a warning, etc.) may be issued. In another example, if the system 100 detects inorganic matter, content being shown on the displays 104 may be paused or turned off.

In an example, the camera 106 may detect remote blood flow of the user, such as a pulse in the eyes, or the general vascular system. Detecting the remote blood flow may be used to determine where features are located on the face of the user. The camera 106 may observe the interior of the goggles 102 (e.g., where visible from the camera 106) and determine if features match expected interior markings, texture, contours, or shapes of the goggles 102. When the features match the expected features, the system 100 may display content on the displays 104, or continue to operate. When the features do not match the expected features, the displays 104 may be disabled, content may be paused or stopped, or the like. In an example, before stopping the content or disabling the displays 104, the system 100 may check for a false negative when the matching features fails, which is described in more detail below.

In an example, content may be supplied to the displays 104 using a cable, such as Video Graphics Array (VGA), Ethernet, High-Definition Multimedia Interface (HDMI), etc. In another example, content may be supped on memory of the goggles 102 (e.g., preloaded). In yet another example, secure content may be transmitted wirelessly to the goggles 102.

Figure 2:
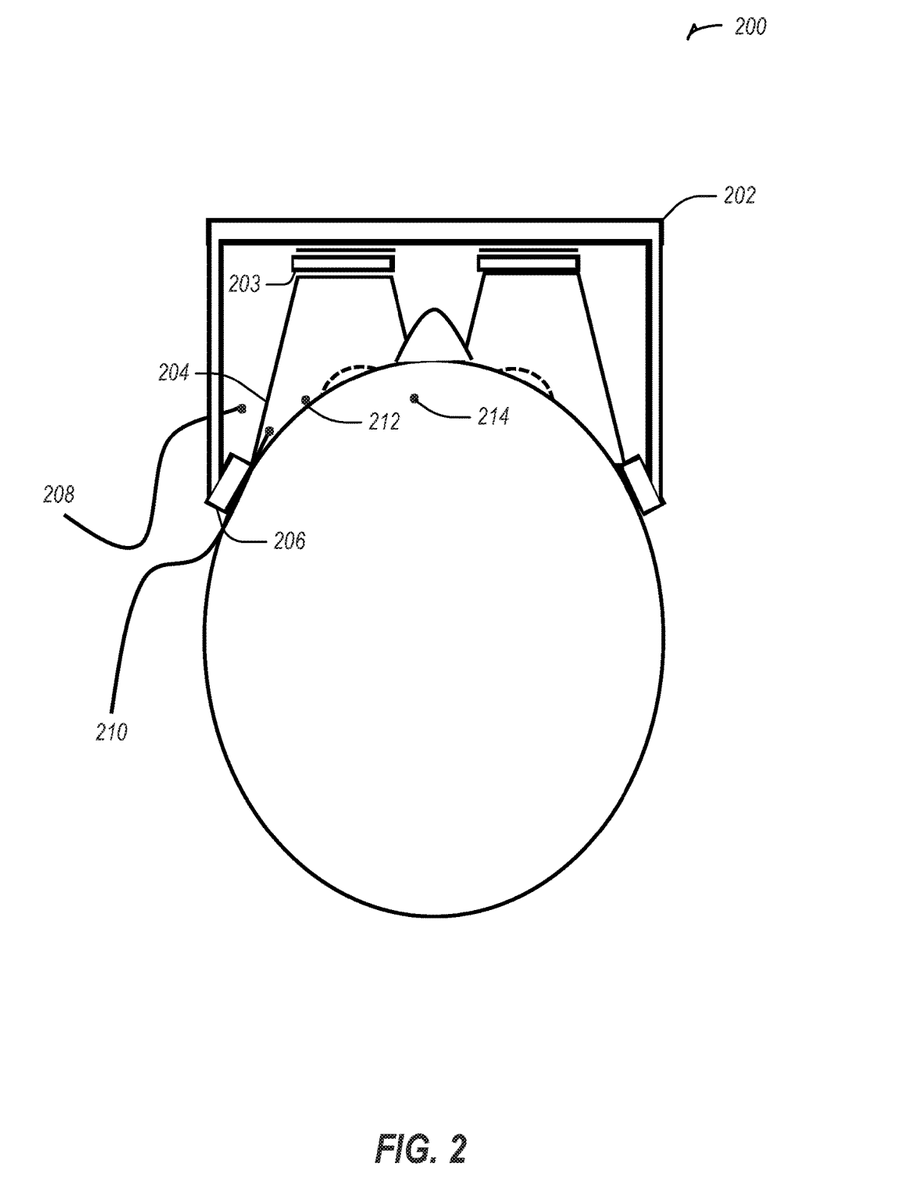
FIG. 2 illustrates a top down view of a system including goggles for secure media viewing in accordance with some embodiments.

FIG. 2 illustrates a top down view of a system 200 including goggles 202 for secure media viewing in accordance with some embodiments. The goggles 202 of system 200 may be the same goggles 102 of system 100 or may differ. The system 200 includes the goggles 202 with a display 203, which projects a field of view 204. The goggles 202 include a gasket 206. The remaining features shown in FIG. 2 illustrate potential breaches from cameras. These potential breaches are monitored and detected using the plurality of cameras (e.g., camera 106) of FIG. 1, the gasket 206, or using other security features of the goggles 202. For example, the first potential breach is from a first camera 208 (e.g., a fiber optic camera) that is outside the field of view 204. Since the first camera 208 is outside the field of view 204 it cannot view the display 203 and may be considered not a breach, as the content displayed on the display 203 would not be visible to the first camera 208.

In an example, a second potential breach is from a second camera 210 (e.g., a fiber optic camera) that is within the field of view 204. A camera (e.g., camera 106) may be used to detect this breach. For example, the plurality of cameras of FIG. 1 may be set up to capture the field of view 204 to detect any cameras present. In another example, the gasket 206 may be used to detect this breach based the cable or connection from the end of the second camera 210 to a point outside the goggles 202.

In an example, a third potential breach is from a third camera 212 (e.g., a micro-camera) placed near a user's eye that is within the field of view 204. A camera (e.g., camera 106) may be used to detect this breach. For example, the plurality of cameras of FIG. 1 may be set up to capture the field of view 204 to detect any cameras present. The field of view 204 includes a field of view of the display 203, such that a camera or eye within the field of view 204 would be able to view the display 203, including viewing or capturing content displayed on the display 203.

A fourth potential breach may come from a fourth camera 214 (e.g., a micro-camera) placed on a user's forehead that is outside the field of view 204. Since fourth camera 214 is outside the field of view 204 it cannot view the display 203 and may be considered not a breach, as the content displayed on the display 203 would not be visible to the fourth camera 214.

To detect a breach camera in the field of view 204, a camera on the goggles 202 may techniques such as infrared non-destructive testing. Other techniques may be used to detect gasket breaches or inorganic material that may be indicative of the breach camera. In an example, the field of view 204 may be narrowed using specific lens or display techniques, or using blinders. The embedded sensors on a camera may use infrared image analysis (e.g., available through a charge-coupled device sensor) to determine non-organic (e.g., non-living) areas. An image or sensor analysis may determine whether anomalous images areas are suspect or not. Parameters may be updated automatically, (e.g., through machines learning or feedback approaches) or may be manually configured.

To monitor the face of the user using aspects of the goggles 202, a camera may use light from the display 203. In an example, a distance from a camera of the system 200 to the face of the user may be at distances of ~12 mm to ~65 mm. A small form factor charge-coupled device may use of a lens system that has a working distances similar to this range. In another example, lens stacks (i.e., macro lens) may be used to reduce the working distance. Additionally, lens systems may be made to articulate (e.g., pan/tilt) within the goggles 202 for further detection.

In an example, a user may be notified if the user is wearing glasses. For example, the glasses may be detected by the camera of the system 200 and identified as unauthorized. In another example, a user may wear contact lenses since an analysis of the field of view would have a reflective property that is consistent with an absence of inorganic material. For example, contact lenses are transparent and may not show up as a false positive when captured by a camera. If a contact lens has a camera built in, then it may reflect some light and a camera pointed at the contact lens will catch inorganic artifacts embedded in the contact lens.

Figure 3:
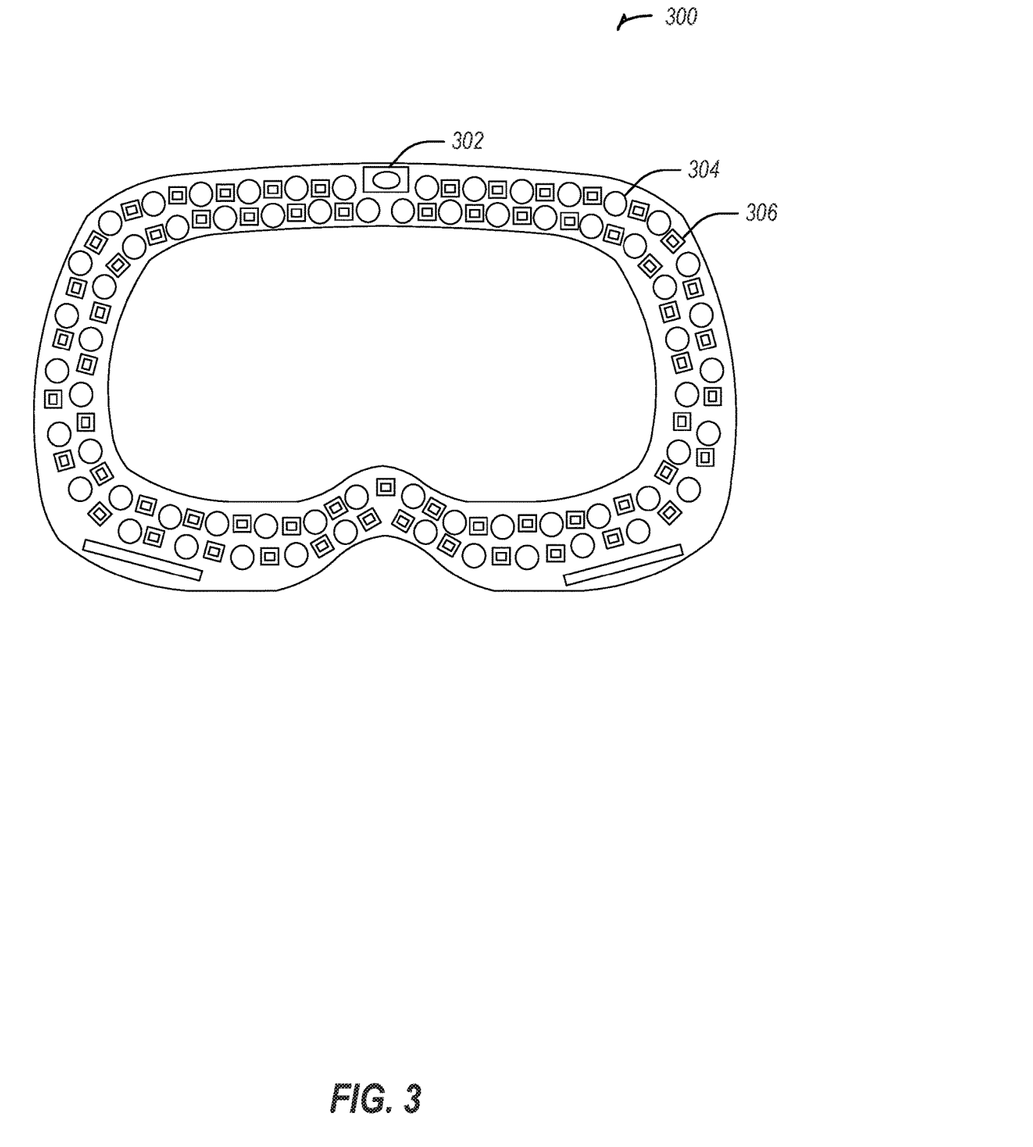
FIG. 3 illustrates a back facing view of goggles for secure media viewing in accordance with some embodiments.

FIG. 3 illustrates a rear view of goggles 300 for secure media viewing in accordance with some embodiments. The goggles 300 include a camera 302, a plurality of LEDs (e.g., LED 304), and a plurality of photodiodes (e.g., photodiode 306).

Where the goggles 300 touch or rest upon skin of a user, a gasket seal may be formed. The goggles 300 may leverage one of several systems to detect if the gasket seal is breached. In an example, a breach may occur when a fiber optic wire or other cable type camera system is inserted between the gasket and the skin of the user. Detecting a foreign object between the gasket and the skin of the user may include detecting whether the skin of the user is in contact with the gasket of the goggles 300.

Detecting a gasket breach may be done using the techniques described below.

For example, photoplethysmography may be used to detect a gasket breach. A technique using photoplethysmography includes using multiple overlapping rows of LEDs as shown in FIG. 3. A breach may be detected by this technique when an absence of blood is detected. This technique includes integrating the LEDs (e.g., LED 304) and photo-diodes (e.g., photodiode 306) such that the LEDs may be used to illuminate the skin of the user and the photodiodes may detect a heartbeat. In another example, alternate methods of implementing effects of photoplethysmography may be used. For example, the alternate methods may include technology such as miniature fluorescence probes, etc. In another example, the interior of the goggles 302 may be coated with sensing polymers to determine van der Waals' forces or flexible organic circuits. In an example, the interior of the goggles 300 may be coated with additional cameras or sensors to determine if the interior of the goggle apparatus has been breached or otherwise manipulated. In an example, techniques used may depend on the desired level of security or cost sensitivities.

In an example, the goggles 300 may use very small (e.g., ~0.5 mm) temperature probes (e.g., Fast Response Platinum Resistance Thermometers (PRTs)) run in series along the gasket to observe a breach. In another example, medical sensors leveraging temperature coefficient of resistance (TCR) polymer matrices may be used to detect both temperature and moisture on the skin of the user. The TCR matrices may include a 1 mm 2-sensor matrix embedded in a Si nano-membrane. These examples may be used to prevent an attack vector using a sliding fiber optic based micro-camera (for example) in between the gasket and the user's face.

In another example, an attack vector may include drilling a hole through the gasket. The techniques described below may be used to detect a drilled hole. For example, to detect a breach of a gasket where a hole is drilled through the gasket includes using infrared non-destructive testing (IRNDT) of materials. This technique may be similar to inspecting the user's face for small mounted cameras. In an example, this technique may be used to identify cracks, defects, voids, cavities and other inhomogeneities. In another example, a technique may use thermochromatic polymer strips or dots.

Figure 4:
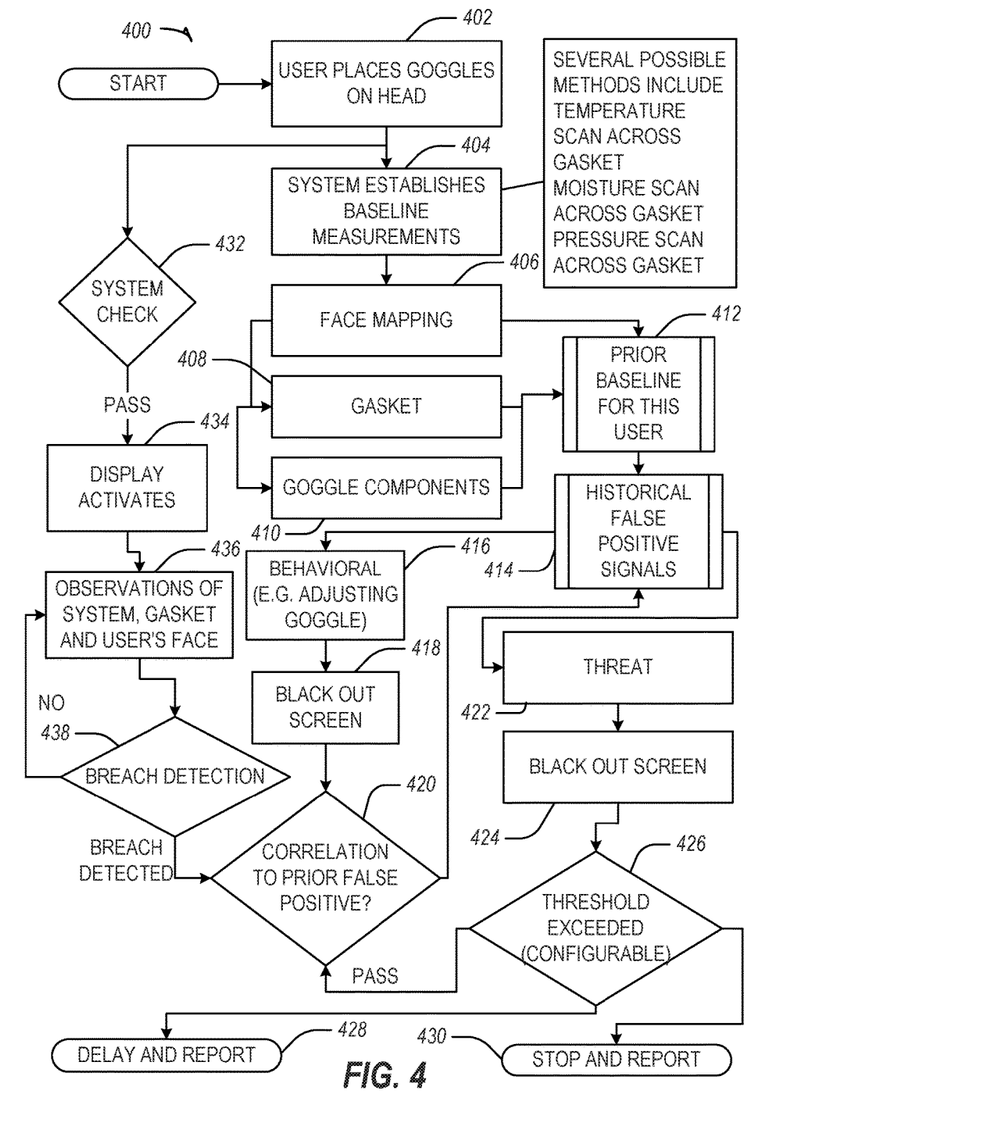
FIG. 4 illustrates a block diagram for detecting and reporting a breach in a goggles system in accordance with some embodiments.

FIG. 4 illustrates a block diagram 400 for detecting and reporting a breach in a goggles system in accordance with some embodiments. The block diagram 400 includes a block 402 where a user places goggles on the user's head. In an example, an application (e.g., viewed on a display of the goggles or on a user device) may be used to initiate or control the display of the goggles. The user may be validated independently, such as using multi factor authentication techniques. The block diagram 400 includes a block 404 to establish baseline measurements using the goggles system. The block diagram 400 includes a block 406 to map a face of the user. This may include determining whether a face of the user is an appropriate distance (e.g., within a range of distance based on the goggle size, support structure length, or the like). The block diagram 400 includes a block 408 to monitor gaskets. The block diagram 400 includes a block 410 to monitor goggle components. The block diagram 400 includes a block 412 to establish a baseline for the user or retrieve a prior baseline for the user from memory.

The block diagram 400 includes a block 414 to check for historical false positive signals for the user. The block diagram 400 includes a block 416 to determine if a change in a component comes from a behavioral action by the user (e.g., adjusting the goggles). The block diagram 400 includes a block 418 to black out a screen preliminarily. The block diagram 400 includes a decision block 420 to determine whether a breach detection is correlated to a prior false positive breach. The block diagram 400 includes a block 422 to identify that a threat (e.g., a breach) is in progress or has occurred based on determining that the breach is not correlated to any prior false positive breach at the decision block 420. The block diagram 400 includes a block 424 to black out a screen to prevent the threat from recording or viewing secure media. Block 414 may determine based on historical false positive signals whether to proceed to block 416 or block 422. The type of historical false positive signals or the likelihood of a false positive signal may be used to determine to which block to proceed (e.g., 416 or 422).

The block diagram 400 includes a decision block 426 to determine if a threshold (e.g., a configurable or predetermined threshold) has been exceeded. When the threshold has not been exceeded, the goggles system may return to determining if a breach occurs at block 420. Returning to block 420 from decision block 426 results in continued normal operation. If the threshold has been exceeded, the block diagram 400 may move to endpoint 428 or endpoint 430. The endpoint 428 includes delaying view of the secure media and reporting the breach. The endpoint 430 includes stopping view of the secure media and reporting the breach. The decision block 426 may determine whether to continue with endpoint 428 or endpoint 430 based on the nature of a breach, the degree of correlation with a prior false positive, a number of previously identified breaches, the degree of security desired in the system, a second threshold, etc.

The block diagram 400 includes a decision block 432 to perform a system check when the goggles are turned on. In an example, the system check is run after an initialization period. In another example, if baseline measurements for the user were previously determined, the system check may run on startup of the goggles. The block 434 includes activating a display (e.g., a screen) for viewing secure media. The block diagram 400 includes a block 436 to observe the system, including monitoring gaskets and the user's face. The block diagram 400 includes a decision block 438 to determine if a breach has occurred. When a breach is detected at decision block 438, the breach is checked against prior false positives at decision block 420, as described above. When a breach is not detected at decision block 438, the system may continue to be monitored for breaches at block 436.

Figure 5:
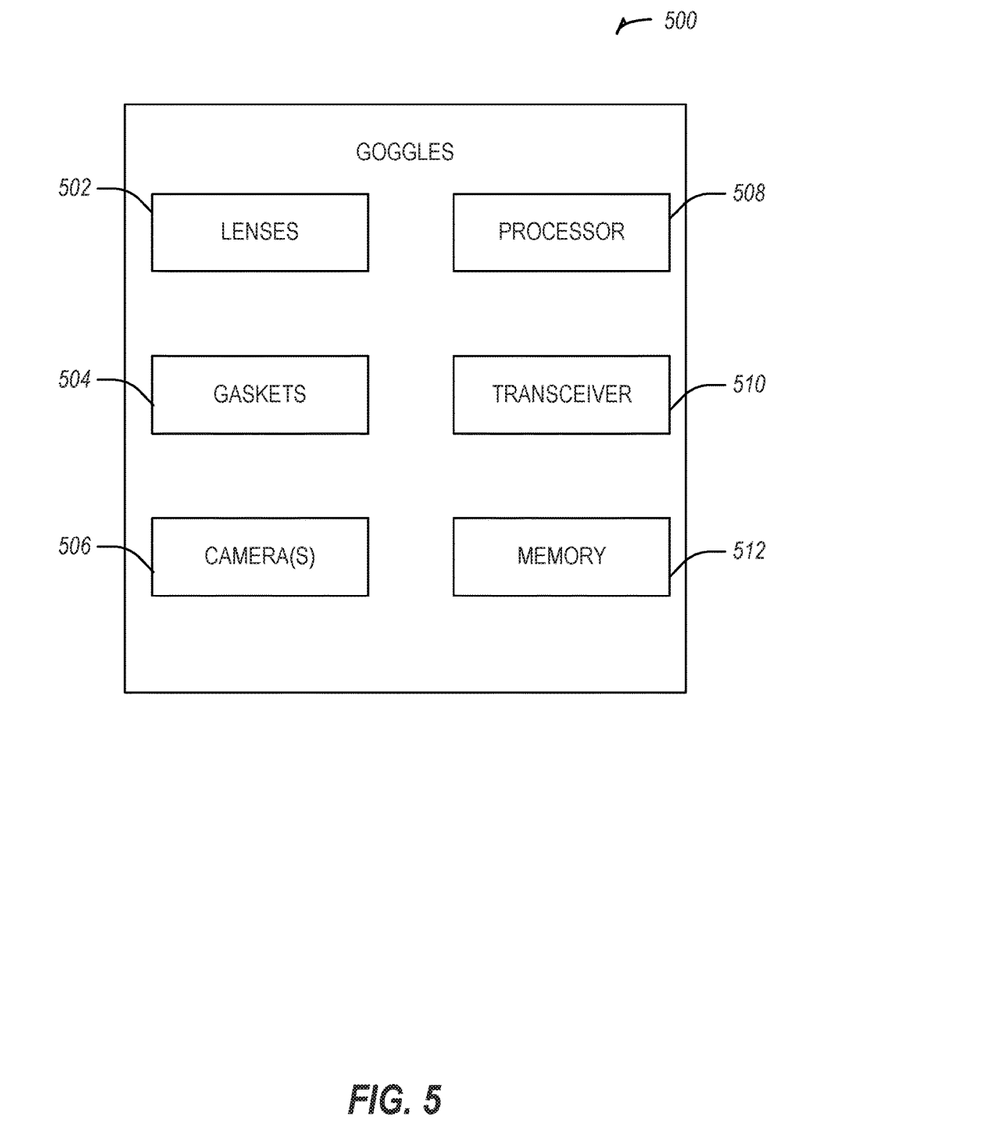
FIG. 5 illustrates goggles in accordance with some embodiments.

FIG. 5 illustrates goggles 500 in accordance with some embodiments. The goggles 500 includes lenses 502, gaskets 504, a camera 506, a processor 508, a transceiver 510, and memory 512. The lenses 502 may include a pair of lenses. The lenses 502 may be mounted in the goggles 500, and at least one of the pair of lenses may display secure media. The gaskets 504 may be applied on a surface of the goggles 500, such as a surface facing a user (e.g., a face of the user). The surface may be designed to rest flush against the user. The gaskets 504 may detect whether a breach has occurred. To detect the breach with the gaskets 504, the gaskets 504 may produce information to be used in a photoplethysmogram, such as to determine an absence of blood flow. In an example, the gaskets 504 may include a miniature fluorescence probe. In another example, the gaskets 504 may include a temperature probe, a moisture sensor, or a pressure sensor to detect a breach. In yet another example, the gaskets 504 may include a thermochromic polymer strip to detect a breach.

The goggles 500 include the camera 506 mounted on the goggles 500, the camera 506 to detect whether inorganic matter is present within a field of view, such as using infrared non-destructive testing. The field of view may include an area inside space created by the surface (including the gaskets 504), a lens surface containing the lenses 502 and other support surfaces as well as the face of the user. In an example, the camera 506 may determine a distance from the camera 506 to the user and validate whether the distance corresponds to a predetermined distance (e.g., a known distance from a location of the camera 506 to the user, such as by using the distance of support surfaces of the goggles 500 or via prior testing). The lenses 502 may include displays such as an embedded LCD, an LED, an OLED, or the like. In an example, a lens of the lenses 502 may display augmented reality media or virtual reality media.

The transceiver 510 may be used to issue an alert, such as an alert in response to a gasket of gaskets 504 detecting a breach or the camera detecting inorganic matter. The alert may be stored to the memory 512 for later inspection or production, such as a log of potential breaches, or for use in machine learning to eliminate false positive breach detection. In an example, before a lens of the lenses 502 displays secure media, the camera 506 may validate that inorganic matter is absent within the area or the gaskets 504 may validate that a breach has not occurred. The validation by the camera 506 or the gaskets 504 may be ongoing while the secure media is displayed on a lens of the lenses 502. When a breach is detected, the lens of the lenses 502 may stop or pause the secure media, or may disconnect from a media source.

In an example, the processor 508 may authenticate the user, such as prior to a lens of the lenses 502 displaying secure media. Authenticating the user may include using the processor 508 to do multi factor authentication (e.g., authenticating the user with a wearable device and a password, etc.). In an example, the transceiver 510 may be used to wirelessly receive secure media content.

Figure 6:
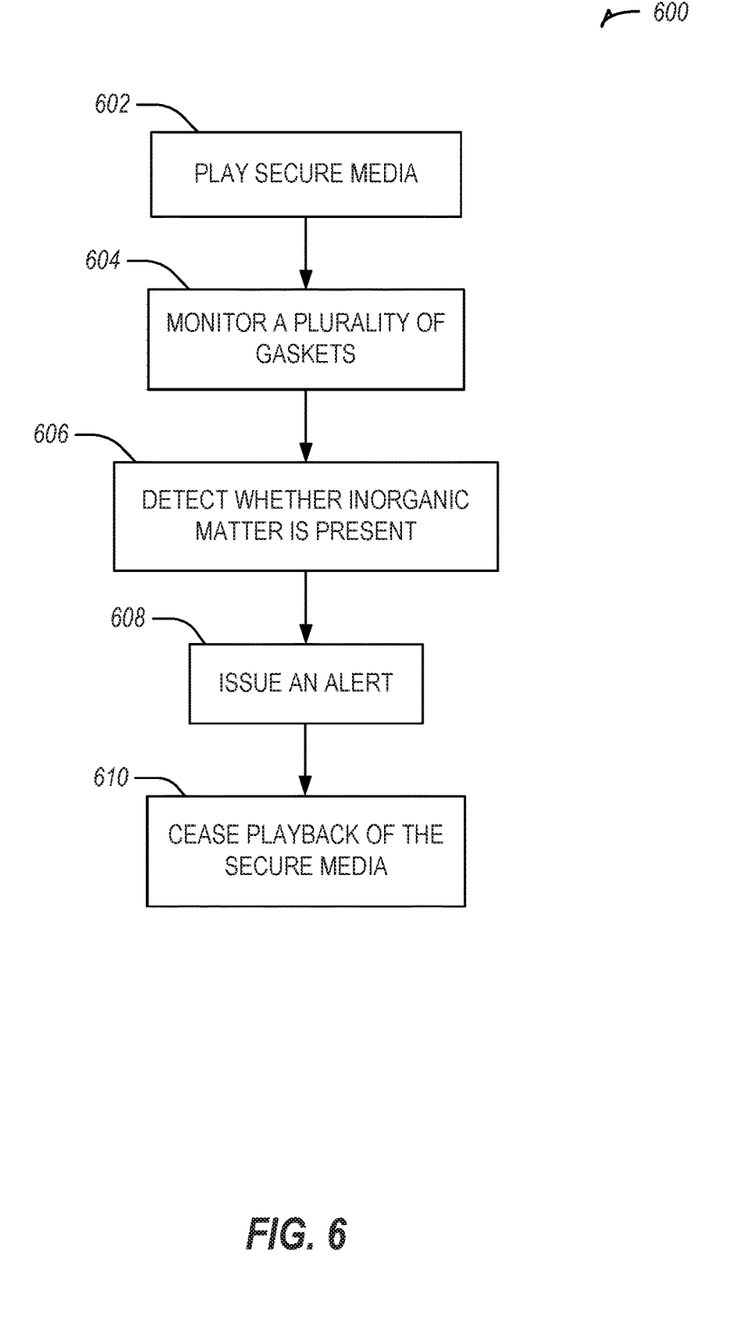
FIG. 6 illustrates a flow chart showing a technique for playing secure media in accordance with some embodiments.

FIG. 6 illustrates a flow chart showing a technique 600 for playing secure media in accordance with some embodiments. The technique 600 includes an operation 602 to play secure media, such as by using a lens of a pair of goggles. Before playing the secure media, the pair of goggles may validate that inorganic matter is absent within an area and that a breach has not occurred. In an example, a user may be authenticated prior to playing the secure media. The authentication may include multi factor authentication. The secure media may include video, audio, augmented reality media, virtual reality media, or the like.

The technique 600 includes an operation 604 to monitor a plurality of gaskets, such as to determine whether a breach has occurred. The technique 600 includes an operation 606 to detect whether inorganic matter is present, such as by using a camera mounted on the pair of goggles. The camera may be used to determine a distance from the camera to the user and validating whether the distance corresponds to a predetermined distance.

The technique 600 includes an operation 608 to issue an alert. The alert may be issued in response to detecting a breach or detecting inorganic matter. In an example, detecting a breach may include determining an absence of blood flow using a photoplethysmogram produced from the plurality of gaskets. In another example, the breach may be detected using a miniature fluorescence probe, a temperature probe, a moisture sensor, a pressure sensor, a thermochromic polymer strip, or the like. Detecting that inorganic matter is present may include using infrared non-destructive testing, such as with the camera.

The technique 600 includes an operation 610 to cease playback of the secure media. Operation 610 may be performed in response to the alert or in response to detecting inorganic matter or in response to detecting a breach. The alert may be sent out wirelessly using a transceiver or stored in memory of the pair of goggles. In an example, the transceiver may be used to wirelessly receive the secure media at the pair of goggles.

Figure 7:
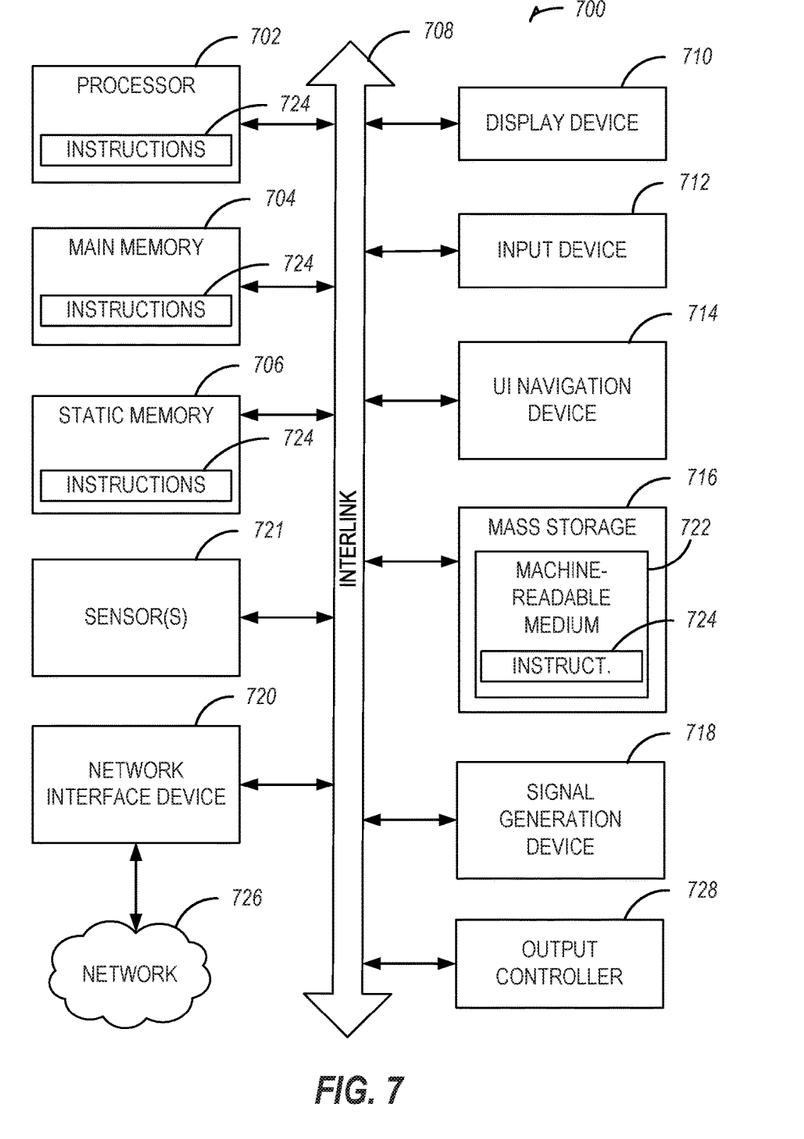
FIG. 7 illustrates generally an example of a block diagram of a machine upon which any one or more of the techniques discussed herein may perform in accordance with some embodiments.

FIG. 7 illustrates generally an example of a block diagram of a machine 700 upon which any one or more of the techniques (e.g., methodologies) discussed herein may perform in accordance with some embodiments. In alternative embodiments, the machine 700 may operate as a standalone device or may be connected (e.g., networked) to other machines. In a networked deployment, the machine 700 may operate in the capacity of a server machine, a client machine, or both in server-client network environments. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, alphanumeric input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 that is non-transitory on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, IEEE 802.11.1 standards known as Bluetooth®, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

Various Notes & Examples

Each of these non-limiting examples may stand on its own, or may be combined in various permutations or combinations with one or more of the other examples.

Example 1 is goggles for displaying secure media comprising: a pair of lenses mounted in the goggles, at least one of the pair of lenses to display secure media; a plurality of gaskets applied on a surface of the goggles, the surface facing a user and designed to rest flush against the user, the plurality of gaskets to detect whether a breach has occurred; a camera mounted on the goggles, the camera to detect whether inorganic matter is present within a field of view; and a transceiver to issue an alert in response to a gasket of the plurality of gaskets detecting the breach or the camera detecting inorganic matter.

In Example 2, the subject matter of Example 1 optionally includes wherein, before the at least one of the pair of lenses displays the secure media, the camera is further to validate that inorganic matter is absent within the area and the plurality of gaskets are further to validate that the breach has not occurred.

In Example 3, the subject matter of any one or more of Examples 1-2 optionally include wherein the camera is further to determine a distance from the camera to the user and validate whether the distance corresponds to a predetermined distance.

In Example 4, the subject matter of any one or more of Examples 1-3 optionally include a processor to authenticate the user prior to the at least one of the pair of lenses displaying the secure media.

In Example 5, the subject matter of Example 4 optionally includes wherein to authenticate the user, the processor is to use multi factor authentication.

In Example 6, the subject matter of any one or more of Examples 1-5 optionally include wherein the lens includes a plurality of embedded LCDs.

In Example 7, the subject matter of any one or more of Examples 1-6 optionally include wherein to display the secure media, the at least one of the pair of lenses is to present augmented reality media.

In Example 8, the subject matter of any one or more of Examples 1-7 optionally include wherein to detect that the breach has occurred, the plurality of gaskets are to produce information to be used in a photoplethysmogram to determine an absence of blood flow.

In Example 9, the subject matter of any one or more of Examples 1-8 optionally include wherein the plurality of gaskets include a plurality of miniature fluorescence probes.

In Example 10, the subject matter of any one or more of Examples 1-9 optionally include wherein the plurality of gaskets include at least one of a plurality of temperature probes, a plurality of moisture sensors, or a plurality of pressure sensors.

In Example 11, the subject matter of any one or more of Examples 1-10 optionally include wherein the plurality of gaskets include a plurality of thermochromic polymer strips.

In Example 12, the subject matter of any one or more of Examples 1-11 optionally include wherein to detect whether the inorganic matter is present, the camera is to use infrared non-destructive testing.

In Example 13, the subject matter of any one or more of Examples 1-12 optionally include wherein the transceiver is further to wirelessly receive the media.

Example 14 is a method for securely displaying media using a pair of goggles, the method comprising: playing secure media using a lens of the pair of goggles; monitoring a plurality of gaskets mounted on the pair of goggles to determine whether a breach has occurred; detecting, using a camera mounted on the pair of goggles, whether inorganic matter is present within a field of view; issuing an alert in response to detecting the breach or detecting inorganic matter; and ceasing playback of the secure media in response to the alert.

In Example 15, the subject matter of Example 14 optionally includes validating that inorganic matter is absent within the area and that the breach has not occurred before playing the secure media.

In Example 16, the subject matter of any one or more of Examples 14-15 optionally include determining, using the camera a distance from the camera to the user and validating whether the distance corresponds to a predetermined distance.

In Example 17, the subject matter of any one or more of Examples 14-16 optionally include authenticating the user prior to playing the secure media.

In Example 18, the subject matter of Example 17 optionally includes wherein authenticating the user includes using multi factor authentication.

In Example 19, the subject matter of any one or more of Examples 14-18 optionally include wherein the lens includes a plurality of embedded LCDs.

In Example 20, the subject matter of any one or more of Examples 14-19 optionally include wherein playing the secure media includes presenting augmented reality media.

In Example 21, the subject matter of any one or more of Examples 14-20 optionally include wherein detecting the breach has occurred includes determining an absence of blood flow using a photoplethysmogram produced from the plurality of gaskets.

In Example 22, the subject matter of any one or more of Examples 14-21 optionally include wherein the plurality of gaskets include a plurality of miniature fluorescence probes.

In Example 23, the subject matter of any one or more of Examples 14-22 optionally include wherein the plurality of gaskets include at least one of a plurality of temperature probes, a plurality of moisture sensors, or a plurality of pressure sensors.

In Example 24, the subject matter of any one or more of Examples 14-23 optionally include wherein the plurality of gaskets include a plurality of thermochromic polymer strips.

In Example 25, the subject matter of any one or more of Examples 14-24 optionally include wherein detecting whether the inorganic matter is present includes using infrared non-destructive testing.

In Example 26, the subject matter of any one or more of Examples 14-25 optionally include wirelessly receiving the secure media at the pair of goggles.

Example 27 is at least one machine-readable medium including instructions for operation of a computing system, which when executed by a machine, cause the machine to perform operations of any of the methods of Examples 14-26.

Example 28 is an apparatus comprising means for performing any of the methods of Examples 14-26.

Example 29 is an apparatus for securely displaying media using a pair of goggles, the apparatus comprising: means for playing secure media using a lens of the pair of goggles; means for monitoring a plurality of gaskets mounted on the pair of goggles to determine whether a breach has occurred; means for detecting, using a camera mounted on the pair of goggles, whether inorganic matter is present within a field of view; means for issuing an alert in response to detecting the breach or detecting inorganic matter; and means for ceasing playback of the secure media in response to the alert.

In Example 30, the subject matter of Example 29 optionally includes means for validating that inorganic matter is absent within the area and that the breach has not occurred before playing the secure media.

In Example 31, the subject matter of any one or more of Examples 29-30 optionally include means for determining, using the camera a distance from the camera to the user and validating whether the distance corresponds to a predetermined distance.

In Example 32, the subject matter of any one or more of Examples 29-31 optionally include means for authenticating the user prior to playing the secure media.

In Example 33, the subject matter of Example 32 optionally includes wherein the means for authenticating the user include means for using multi factor authentication.

In Example 34, the subject matter of any one or more of Examples 29-33 optionally include wherein the lens includes a plurality of embedded LCDs.

In Example 35, the subject matter of any one or more of Examples 29-34 optionally include wherein the means for playing the secure media include means for presenting augmented reality media.

In Example 36, the subject matter of any one or more of Examples 29-35 optionally include wherein the means for detecting the breach has occurred include means for determining an absence of blood flow using a photoplethysmogram produced from the plurality of gaskets.

In Example 37, the subject matter of any one or more of Examples 29-36 optionally include wherein the plurality of gaskets include a plurality of miniature fluorescence probes.

In Example 38, the subject matter of any one or more of Examples 29-37 optionally include wherein the plurality of gaskets include at least one of a plurality of temperature probes, a plurality of moisture sensors, or a plurality of pressure sensors.

In Example 39, the subject matter of any one or more of Examples 29-38 optionally include wherein the plurality of gaskets include a plurality of thermochromic polymer strips.

In Example 40, the subject matter of any one or more of Examples 29-39 optionally include wherein the means for detecting whether the inorganic matter is present include means for using infrared non-destructive testing.

In Example 41, the subject matter of any one or more of Examples 29-40 optionally include means for wirelessly receiving the secure media at the pair of goggles.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. Goggles for displaying secure media comprising:
a pair of lenses mounted in the goggles, at least one of the pair of lenses to display secure media;
a plurality of gaskets applied on a surface of the goggles, the surface facing a user, the plurality of gaskets to detect whether a breach has occurred, and the plurality of gaskets to form an airtight seal with the user to create an interior area of the goggles, wherein the breach is a loss of the airtight seal between a gasket of the plurality of gaskets and the user while the goggles remain worn by the user;

a camera mounted in the interior of the goggles and directed to the interior area of the goggles, the camera to observe the user's face present in the interior area of the goggles and to detect whether inorganic matter is present within a field of view of the pair of lenses; and a transceiver to issue an alert in response to a gasket of the plurality of gaskets detecting the breach or the camera detecting inorganic matter.

2. The goggles of claim 1, wherein, before the at least one of the pair of lenses displays the secure media, the camera is further to validate that inorganic matter is absent within the interior area and the plurality of gaskets are further to validate that the breach has not occurred.

3. The goggles of claim 1, wherein the camera is further to determine a distance from the camera to the user and validate whether the distance corresponds to a predetermined distance.

4. The goggles of claim 1, further comprising a processor to authenticate the user prior to the at least one of the pair of lenses displaying the secure media.

5. The goggles of claim 4, wherein to authenticate the user, the processor is to use multi factor authentication.

6. The goggles of claim 1, wherein the pair of lenses includes a plurality of embedded liquid crystal displays.

7. The goggles of claim 1, wherein to display the secure media, the at least one of the pair of lenses is to present augmented reality media.

8. The goggles of claim 1, wherein to detect that the breach has occurred, the plurality of gaskets are to produce information to be used in a photoplethysmogram to determine an absence of blood flow.

9. The goggles of claim 1, wherein the plurality of gaskets include a plurality of miniature fluorescence probes.

10. The goggles of claim 1, wherein the plurality of gaskets include at least one of a plurality of temperature probes, a plurality of moisture sensors, or a plurality of pressure sensors.

11. The goggles of claim 1, wherein the plurality of gaskets include a plurality of thermochromic polymer strips.

12. The goggles of claim 1, wherein to detect whether the inorganic matter is present, the camera is to use infrared non-destructive testing.

13. The goggles of claim 1, wherein the transceiver is further to wirelessly receive the secure media.

14. A method for securely displaying media using a pair of goggles, the method comprising:

playing secure media using a lens of the pair of goggles;

monitoring a plurality of gaskets to detect whether a breach has occurred, wherein the plurality of gaskets are applied on a surface of the goggles, the surface facing a user, and the plurality of gaskets to form an airtight seal with the user to create an interior area of the goggles, and wherein the breach is a loss of the airtight seal between a gasket of the plurality of gaskets and the user while the goggles remain warn by the user;

detecting, using a camera mounted in the interior of the pair of goggles and directed to the interior area of the goggles, whether inorganic matter is present within a field of view of the pair of lenses;

observing, using the camera, the user's face present in the interior area of the goggles;

issuing an alert in response to detecting the breach or detecting inorganic matter; and ceasing playback of the secure media in response to the alert.

15. The method of claim 14, further comprising validating that inorganic matter is absent within the interior area and that the breach has not occurred before playing the secure media.

16. The method of claim 14, further comprising determining, using the camera a distance from the camera to the user and validating whether the distance corresponds to a predetermined distance.

17. The method of claim 14, further comprising authenticating the user prior to playing the secure media.

18. The method of claim 17, wherein authenticating the user includes using multi factor authentication.

19. At least one non-transitory machine-readable medium including instructions for operation of a computing system, which when executed by a machine, cause the machine to:

play secure media using a lens of a pair of goggles;

monitor a plurality of gaskets to detect whether a breach has occurred, wherein the plurality of gaskets are applied on a surface of the goggles, the surface facing a user, and the plurality of gaskets to form an airtight seal with a user to create an interior area of the goggles, and wherein the breach is a loss of the airtight seal between a gasket of the plurality of gaskets and the user while the goggles remain worn by the user;

detect, using a camera mounted in the interior of the pair of goggles and directed to the interior of the goggles, whether inorganic matter is present within a field of view of the pair of lenses;

observe, using the camera, the user's face present in the interior area of the goggles;

issue an alert in response to detecting the breach or detecting inorganic matter; and cease playback of the secure media in response to the alert.

20. The at least one non-transitory machine-readable medium of claim 19, wherein the instructions to play the secure media include instructions to present augmented reality media.

21. The at least one non-transitory machine-readable medium of claim 19, wherein the instructions to detect the breach has occurred include instructions to determine an absence of blood flow using a photoplethysmogram produced from the plurality of gaskets.

22. The at least one non-transitory machine-readable medium of claim 19, wherein the plurality of gaskets include a plurality of miniature fluorescence probes.

23. The at least one non-transitory machine-readable medium of claim 19, wherein the plurality of gaskets include at least one of a plurality of temperature probes, a plurality of moisture sensors, or a plurality of pressure sensors.

24. The at least one non-transitory machine-readable medium of claim 19, wherein the plurality of gaskets include a plurality of thermochromic polymer strips.

25. The at least one non-transitory machine-readable medium of claim 19, wherein the instructions to detect whether the inorganic matter is present include instructions to use infrared non-destructive testing.

* * * * *

UNITED STATES PATENT AND TRADEMARK OFFICE
CERTIFICATE OF CORRECTION

PATENT NO. : 10,230,719 B2
APPLICATION NO. : 15/269440
DATED : March 12, 2019
INVENTOR(S) : Vaughn et al.

Page 1 of 1

It is certified that error appears in the above-identified patent and that said Letters Patent is hereby corrected as shown below:

In the Claims

Column 13, Line 58, Claim 14, delete "warn" and insert --worn-- therefor

Signed and Sealed this
Fourteenth Day of April, 2020

Andrei Iancu
*Director of the United States Patent and Trademark Office*